United States Patent [19]
Hall

[11] 3,834,852
[45] Sept. 10, 1974

[54] APPARATUS FOR FORMING BLOW MOLDED CONTAINER OF ORIENTED THERMOPLASTIC POLYMERS

[75] Inventor: John N. Hall, Newark, Del.

[73] Assignee: Hercules Incorporated, Wilmington, Del.

[22] Filed: July 16, 1973

[21] Appl. No.: 379,299

[52] U.S. Cl.............. 425/326 B, 425/203, 425/233
[51] Int. Cl............................................ B29d 23/03
[58] Field of Search ... 425/326 B, 387 B, DIG. 203, 425/DIG. 204, DIG. 233

[56] References Cited
UNITED STATES PATENTS

| | | | |
|---|---|---|---|
| 3,303,249 | 2/1967 | Strauss | 425/387 B X |
| 3,457,592 | 7/1969 | Winchester | 425/326 B |
| 3,751,542 | 8/1973 | Hall | 425/326 B |

Primary Examiner—Gil Weidenfeld
Attorney, Agent, or Firm—James W. Peterson

[57] ABSTRACT

In a continuously operated blow molding machine utilizing a pair of molding units, each mold unit having two mold halves, said mold units being closed at a backward position and movable to a forward position so as to orient a preformed tube in the forward position, the tube being blown into a container, said mold unit opening and moving to the backward position without any interference with the other mold unit. Each mold half consists of a neck forming and a body forming component slidably connected to each other by a sliding guide means for forcing axially the tube inside of the mold cavity so as to relieve longitudinal orienting stresses and provide fully formed threads in the threaded neck portion of the container.

1 Claim, 5 Drawing Figures

APPARATUS FOR FORMING BLOW MOLDED CONTAINER OF ORIENTED THERMOPLASTIC POLYMERS

BACKGROUND OF THE INVENTION

This invention relates to improvements in blow molding machines for use in the manufacture of plastic containers such as bottles having threaded neck portions and being an oriented structure from such crystalline thermoplastic polymers as high-density polyethylene, polypropylene and poly-1-butene.

In blow molding of plastic materials, the common method is to form a continuous tube from the material and inflate each section of the preformed pipe, that is to say parison, into the desired container shape within the mold of the blow molding machine. In one method, the plastic material is first turned into an oriented tube thereby being structurally oriented in one direction. In a more recent method, the preformed tube is oriented along two axes thereby obtaining greater mechanical strength and improved transparency in the molded container. The oriented preformed tube must be inflated at a temperature slightly below the crystalline melting point if the desired properties, namely, greater strength and improved transparency, are to be retained in the end product. At such a low temperature, the material lacks plasticity and hence presents a number of molding difficulties, one of which being poor shape definition in the threaded neck portion of the container. This deficiency is due to the material not having sufficient fluidity to be able to fill at a practical inflation pressure the thread-forming recesses and other cavities provided on the mold surfaces, and further due to stretching in an axial direction.

The instant invention overcomes the deficiencies encountered by the prior methods by moving the parison within the mold in the thread forming region to provide fully formed threads on the bottle. This general thread forming method was shown in my U.S. Pat. No. 3,651,186 for bottle forming from short lengths of tubing. The instant invention provides a solution to the problem of forming from a continuous moving tube by providing molds of special design that form complete threads on the moving bottle.

SUMMARY OF THE INVENTION

The invention is a method and the apparatus for continuously forming a blow molded container having a threaded neck portion from a continuous tube of oriented crystalline thermoplastic polymer. To accomplish this result the instant invention provides split molds having neck forming portions and body forming portions, said portions being moveable with respect to each other to relieve orienting stresses in the neck portion and thus provide fully formed threads on the container.

OBJECTS OF THE INVENTION

It is the object of the instant invention to provide a novel method and apparatus capable of producing on molded plastic containers, sharply defined threaded neck portions and other convolutions.

Other objects and precise nature of this invention will become evident from the following description and accompanying drawing.

DESCRIPTION OF THE PREFERRED EMBODIMENT

Figure 1:
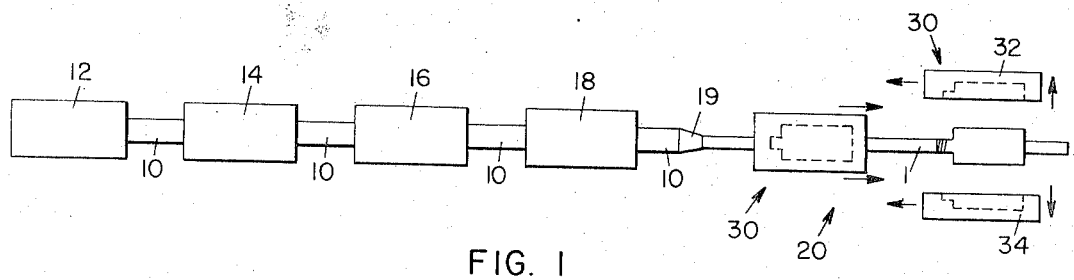
FIG. 1 is a simplified flowchart representing a blow molding process for making oriented threaded plastic containers.

In FIG. 1, the reference numeral 10 is a tube of thermoplastic polymer extruded continuously from an extruder 12. The extruded tube 10 passes through a sizer 14 and enters a cooling chamber 16, in which the polymer tube is cooled to a predetermined temperature below its crystallization temperature. As a result of this cooling, crystallization takes place in the polymer tube. The temperature to which the tube is cooled in the chamber 16 should preferably be at or below about 120° C. if the polymer is polypropylene. In the crystallized state, the tube 10 enters an oven 18, in which it is heated to its orienting temperature, a temperature slightly below the crystal melting point. Where polypropylene is used, this temperature lies between about 140° C. and about 167° C. Then, in heated state, the tube passes through a squeezing cone 19 and enters a molding unit 30 of this invention, the molding unit 30 being a part of a molding apparatus generally designated by the reference numeral 20.

Figure 2:
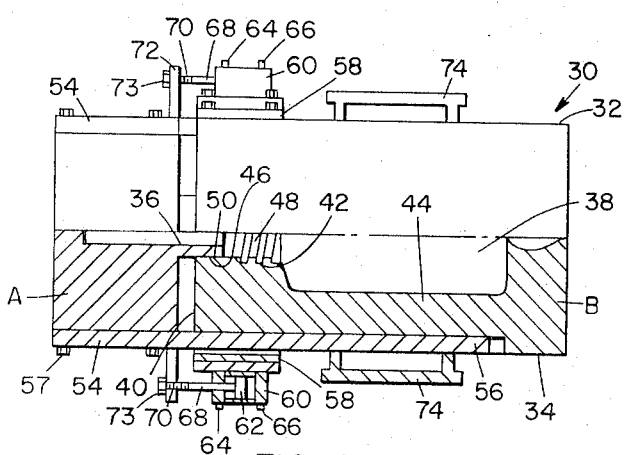
FIG. 2 is an elevation view of a mold constructed according to this invention, with the lower mold half shown in cross section.
Figure 3:
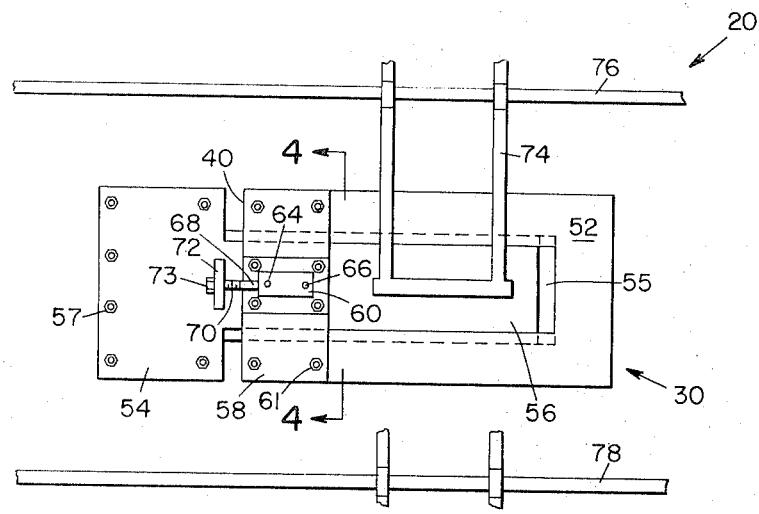
FIG. 3 is a plan view of the same mold.
Figure 4:
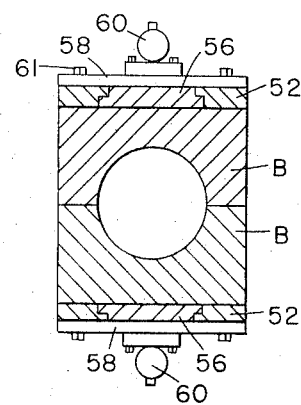
FIG. 4 is a transverse cross sectional view of the same mold, taken at line 4—4 of FIG. 3.

FIGS. 2 and 3 depict the details of the molding unit 30, which is a preferred embodiment of the present invention. The essential components of the mold unit 30 are the two essentially identically shaped and dimensioned mold halves 32 and 34, disposed in symmetrical opposition to constitute a mold unit having a substantially cylindrical bore, that is to say mold cavity inside thereof, presenting four flat sides on the outer side, said mold unit being movable relative to the tube 10. In FIG. 2, the lower mold half 34 is indicated in longitudinal section, and FIG. 4 shows a transverse cross section of mold unit 30.

Each of the mold halves consists of a former A having an insert end 36 and a former B having a container shaping bore or cavity 38 formed in its molding shell 44, a thread forming bore 42 located immediately next to the molding shell 44, and a mating end face 40, which terminates a bore 46 immediately next to the thread forming bore 42. The bore 46 is no larger in diameter than the minor thread diameter of thread forming bore 42 and sized to admit outside diameter part 50 of the insert end 36 of the former A with a sliding fit.

Having thus described the major interior features of the mold unit according to this invention, attention will be given to the exterior features. A top flat surface 52 of the former B, shown in FIG. 3, is provided with a straight sliding way 55 centered between the corner lines and extending from the end face 40 to a point some distance away from the outer end of the former B. This sliding way 55, surrounded by the surface or land 52 admits a leg plate 56 integral with a guide plate

54 which is in turn secured to the top flat surface of the former A by a proper means such as screws 57. In the illustrated instance, the guide plate 54 is in the shape of letter T, with its leg 56 fitted in the sliding way in the fashion of slidable rabbet joint at each sliding edge, as will be noted in FIG. 4. Moreover, with the former A positioned as shown in FIGS. 2 and 3 to present a uniform end clearance relative to end face 40, there is a corresponding marginal room in the sliding way ahead of the leg 56 to allow the former A to be moved axially toward and into face-to-face contact with the end face 40 of the former B. It would be within the scope of the instant invention to provide an alternate guide means such as external guide pins (not shown).

Figure 5:
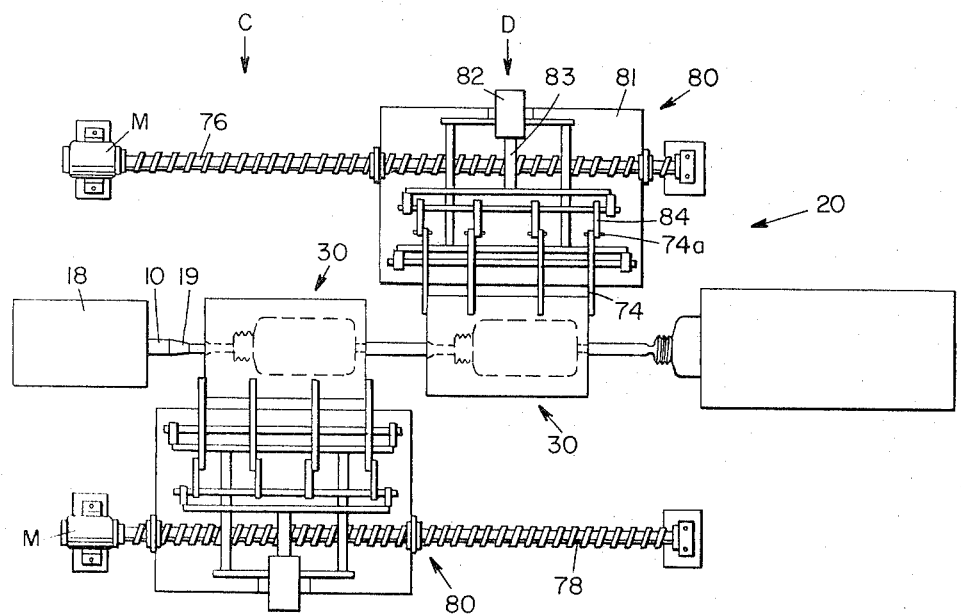
FIG. 5 is a plan view of the mold manipulating device.

A bridge plate 58 is located next to the end face 40 and over and across the leg 56 with a sliding clearance between the plate 58 and leg 56, and being rigidly secured by screws 61, for instance, to the end portions of land 52. Upon this bridge plate 58 is mounted a double-acting hydraulic cylinder 60, whose piston 62 has its piston rod 68 extending toward the former A and connected to a lug 72 anchored to the guide plate 54. The cylinder 60 is provided with two oil ports 64 and 66, through which hydraulic pressure is selectively admitted and relieved for moving the piston 62 back and forth. The piston rod 68 may be threadably received by the lug 72 and locked with a nut 73 run onto its threaded part 70, as shown in FIGS. 2 and 3. Manipulating arms 74, which are members of the mold unit manipulating device shown in FIG. 5 are rigidly attached to the leg plate 56 or the guideplate 54.

It can be seen that former A as described is capable of a limited amount of axial movement relative to the former B. When hydraulic pressure is applied to the cylinder 60 in such a way as to move its piston away from the former A side, the piston rod 68 pulls the former A toward former B, and former A moves, as guided by its guide plate and leg, to reduce the clearance indicated in FIGS. 2 and 3 to zero, that is, to come into contact with the end face 40. In this movement, the forward end of the leg 56 advances into the space provided for this purpose in the sliding way. Reversal of hydraulic pressure pushes the former A away to reintroduce the indicated clearance.

Since the upper mold half 32 is essentially identical in terms of shape, dimensions and construction to the lower mold half 34 thus far described, it is evident that the hydraulic pressure is to be applied to the two hydraulic cylinders 60 in the same directional sense, and that the former A portion of the mold unit 30 will be actuated to move in the manner just described relative to the former B portion. For the purpose of explanation, the movement of the former A due to the clearance will be spoken of as "inward displacement" or "outward displacement" depending on the direction.

According to this invention, two of such mold units as have been described are to be used. An example of the mold unit manipulating device, consisting of two identical mechanisms 80, is shown in FIG. 5. Since the two mechanisms are identical in construction and performance, except for their cyclic performances, the following description focused on one mechanism will suffice.

A lead screw 76 is driven by a reversible motor M. Another lead screw 78 is also driven by another reversible motor. This lead screw threads through a base 81, on which mechanism 80 is mounted, so that, depending on the direction of drive received from motor M, the screw 76 moves the mechanism axially forward or backward, along the line of approach of the tube 10. A hydraulic cylinder 82 mounted on the base 81 actuates the manipulating arms 74 through piston rod 83 and linkage 84. The arms 74 pivot around respective pins 74a and move the mold halves in opening or closing direction accordingly as the piston rod 83 extends or contracts. The former A and former B which constitute the mold, open and close together as if they were an integral body.

The mold unit and its manipulating mechanism move to a backward position C, as driven by the lead screw 76. The mold unit is in opened condition at this time. At the position C, the mold unit closes to grab the tube 10 that has just emerged from the squeezing cone 19 next to the oven 18, and then advances toward a position D, where the container is shaped in the mold in the manner to be described. Upon forming, the mold unit opens to release the molded container and, in opened condition, moves back toward the position C to complete one cycle of molding operation.

The other mold unit moves back and forth between the position C and the position D similarly in such a way that the two mold units alternate between these two positions: when one mold unit in open condition is returning toward the position C, the other mold unit in closed condition advances toward the position D, through the opening between the upper and lower mold halves of the returning mold unit.

The manipulating arms 74 are shown as connected to the former A but may be connected to the former B instead. The choice is merely a matter of preference.

It is evident that the parison or tube 10 is elongated and hence oriented by the movement of the mold unit from the position C to the position D. Axially oriented tube 10 is then blown in the mold unit as will be described. At position C, the mold unit 30 grabs the tube 10 and as it then advances to the position D pressurized air is blown into the hollow of the tube 10 by means of a nozzle (not shown) connected to an air source (not shown), thereby inflating the tube to push its wall against the cavity of the mold unit, so that the tube will conform to the cavity and take the shape of the container. At the beginning of this blowing operation the former A and the former B are in the positions shown in FIGS. 2 and 3, with the displacement clearance introduced in between. During the blowing operation, hydraulic pressure is admitted into the cylinders 60 through the respective ports 64, thereby displacing the former A inwardly and sliding the insert end 36 all the way into the bore 46 until the clearance disappears. By this displacement, that part of the inflating tube wall at the insert end 36 is partially relieved of the large axial orienting stresses caused by axial movement of the mold to allow the internal air pressure to cause the tube wall at the bore 48 to penetrate more readily into the thread forming recesses of the bore 48 and thus conform to the bore shape more accurately. The result is a well-defined, more substantial threaded neck portion of the molded container such as as bottle.

What is claimed is:

1. An apparatus for forming blow molded containers from a continuous tube of oriented thermoplastic polymers, comprising:
   at least two mold units each having two mold halves, each of said halves having first and second forming portions, said portions being slideably connected to each other by a sliding guide means;

hydraulic cylinder means directly connecting said two forming portions so as to move said forming portions axially through a limited axial distance with respect to each other for introducing and eliminating a predetermined amount of clearance between opposed end faces on said two forming portions, said first forming portion having a part protuding beyond its end face, and said second forming portion having a complementary end bore slightly larger in diameter than said protruding part, said second forming portion having an internal thread forming bore next to said end bore, whereby the first forming portion can be moved by said hydraulic cylinder means to eliminate said clearance and said protruding part is received in said complementary end bore while a portion of a continuous polymer tube is kept inflated within the mold unit, so that part of tube wall in the thread forming bore is partially relieved of axial stresses to allow internal air pressure within the tube to force the tube into the thread forming bore and form a complete thread.

* * * * *